United States Patent
Kung

(10) Patent No.: US 7,480,752 B2
(45) Date of Patent: Jan. 20, 2009

(54) REMOTE CONTROLLER AND ITS CONTENT DOWNLOADING AND EXECUTING METHOD

(75) Inventor: Shao-Tsu Kung, Taipei (TW)

(73) Assignee: Compal Electronics Inc., Taipei (TW)

( * ) Notice: Subject to any disclaimer, the term of this patent is extended or adjusted under 35 U.S.C. 154(b) by 317 days.

(21) Appl. No.: 11/493,729

(22) Filed: Jul. 26, 2006

(65) Prior Publication Data

US 2007/0205909 A1    Sep. 6, 2007

(30) Foreign Application Priority Data

Mar. 1, 2006    (TW) .............................. 95106756 A

(51) Int. Cl.
*G05B 19/02* (2006.01)
*G06F 13/00* (2006.01)

(52) U.S. Cl. .................. 710/73; 710/8; 710/9; 710/10; 710/72; 715/744; 715/765; 340/10.5; 340/825.22; 341/176

(58) Field of Classification Search ............... 710/8–10, 710/72, 73; 715/744, 765; 340/10.5, 825.22; 341/176

See application file for complete search history.

(56) References Cited

U.S. PATENT DOCUMENTS

| | | | |
|---|---|---|---|
| 6,437,836 B1 * | 8/2002 | Huang et al. ................. | 348/734 |
| 6,956,496 B1 * | 10/2005 | Herz ..................... | 340/825.22 |
| 7,055,759 B2 * | 6/2006 | Wacker et al. ................ | 236/51 |
| 7,093,003 B2 * | 8/2006 | Yuh et al. .................... | 709/219 |
| 2006/0129488 A1 * | 6/2006 | Vincent ....................... | 705/50 |
| 2006/0143572 A1 * | 6/2006 | Scott et al. ................... | 715/765 |
| 2006/0288300 A1 * | 12/2006 | Chambers et al. ........... | 715/744 |
| 2007/0063860 A1 * | 3/2007 | Escobosa et al. ........ | 340/825.22 |
| 2007/0296552 A1 * | 12/2007 | Huang et al. ................ | 340/10.5 |

* cited by examiner

*Primary Examiner*—Tammara Peyton
(74) *Attorney, Agent, or Firm*—Ming Chow; Sinorica, LLC

(57) ABSTRACT

A remote controller is disclosed to include a housing, a control unit mounted in the housing, a communication unit mounted in the housing and electrically coupled to the control unit and controllable by the control unit to communicate with an external host and to download a control content from the external host, and a display unit, which is installed in housing and electrically coupled to the control unit, having a display zone for displaying the control content downloaded by the communication unit and a control zone for inputting instructions for enabling inputted instructions to be sent to a controlled device by the communication unit to drive the controlled device to execute the instructions.

15 Claims, 7 Drawing Sheets

REMOTE CONTROLLER AND ITS CONTENT DOWNLOADING AND EXECUTING METHOD

BACKGROUND OF THE INVENTION

1. Field of the Invention

The present invention relates to a remote controller and more particularly, to such a remote controller, which downloads control contents from an apparatus or host through an infrared radio or bluetooth device for controlling the operation of a controlled device.

2. Description of the Related Art

Regular electric appliances such as TV, stereo system, DVD player, CD player, MP3 player and etc., are commonly controlled to operate by a remote controller. In case the remote controller is lost or damaged and the user cannot purchase the same model of remote controller from the market, the electric appliance will become useless or the control of the electronic appliance will be inconvenient.

In order to eliminate the aforesaid problem, various universal remote controllers have been created and have appeared on the market. These universal remote controllers have built therein a set of key codes corresponding to different commercial electric appliances. When in use, the user must press a specific key (for example, power key) to send the storage key codes to the controlled device codes in proper order for comparison. When the controlled device gives a respond to one specific key code sent by the remote controller, this specific key code is stored in the remote controller for further operation.

Taiwan Patent M264753, entitled "Universal Remote Controller" (filed on Aug. 3, 2004 by Inventec Appliances Corporation and issued on May 11, 2005) shows an exemplar. According to this design, the universal remote controller provides a personal remote control configuration, and uses an editing module to set different remote control programs corresponding to different models of electric appliances and a touch control interface to run editing, remote control inputting and display functions. This design must use an editing module to edit personal remote control configuration. The use of such an editing module greatly increases the manufacturing cost of the remote controller.

SUMMARY OF THE INVENTION

The present invention has been accomplished under the circumstances in view. It is one object of the present invention to provide a remote controller control content downloading and executing method, which downloads control contents from an apparatus or host through an infrared radio or bluetooth device for controlling the operation of a controlled device. It is another object of the present invention to provide a remote controller control content downloading and executing method, which can download control contents from a host to control the operation of a controlled device without an editing module, thereby saving the manufacturing cost of the remote controller.

To achieve these and other objects of the present invention, the remote controller comprises a housing; a control unit mounted inside the housing; a communication unit mounted inside the housing and electrically coupled to the control unit and controllable by the control unit to communicate with an external host and to download a control content from the external host; and a display unit installed in the housing and electrically coupled to the control unit, the display unit comprising a display zone adapted to display the control content downloaded by the communication unit, and a control zone for inputting instructions for enabling inputted instructions to be sent to a controlled device by the communication unit to drive the controlled device to execute the instructions.

Further, the remote controller control content downloading and executing method comprises (a): providing a remote controller, which comprises a control unit, a communication unit, and a display unit, which has a display zone and a control zone; (b): providing a host, which has at least one control content; (c): using the communication unit to download one of the at least one control content from the host; (d): enabling the control unit to display the downloaded control content on the display zone of the display unit ; (e): clicking the control zone to select an instruction from the downloaded control content; and (f): enabling the control unit to send the selected instruction to a controlled device through the communication unit so as to drive the controlled device to execute the instruction.

DETAILED DESCRIPTION OF THE PREFERRED EMBODIMENT

Figure 1:
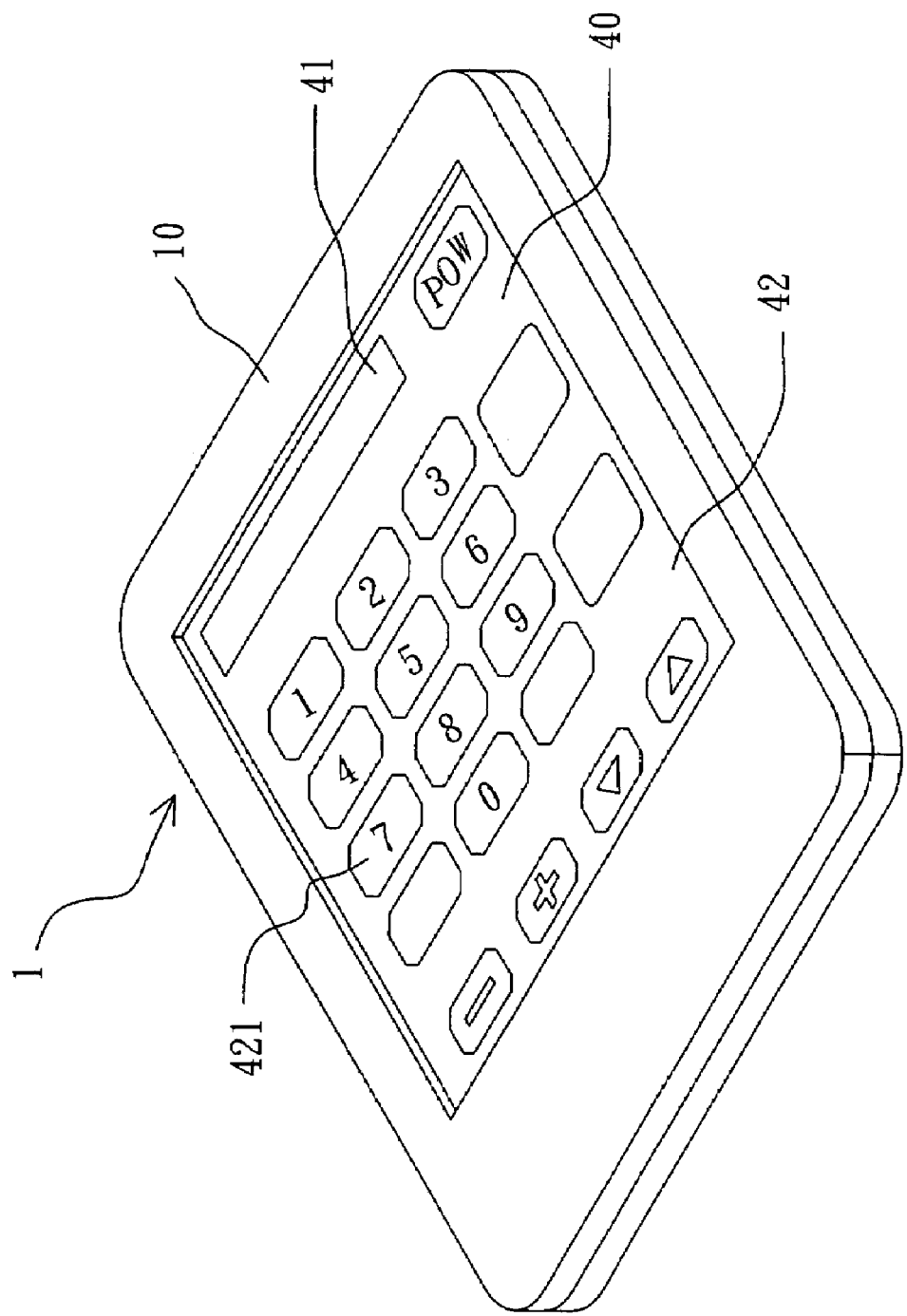
FIG. 1 is an elevational view of a remote controller according to the present invention.

Referring to FIG. 1, a remote controller 1 is shown comprising a housing 10, a control unit 20, a communication unit 30, and a display unit 40.

The housing 10 houses the control unit 20, the communication unit 30 and the display unit 40, having a printed circuit board (not shown) mounted on the inside to carry the control unit 20, the communication unit 30 and the display unit 40, and to provide them with connection circuit means.

The control unit 20 is mounted inside the housing 10, and adapted to control the operation of the remote controller 1.

Figure 3:
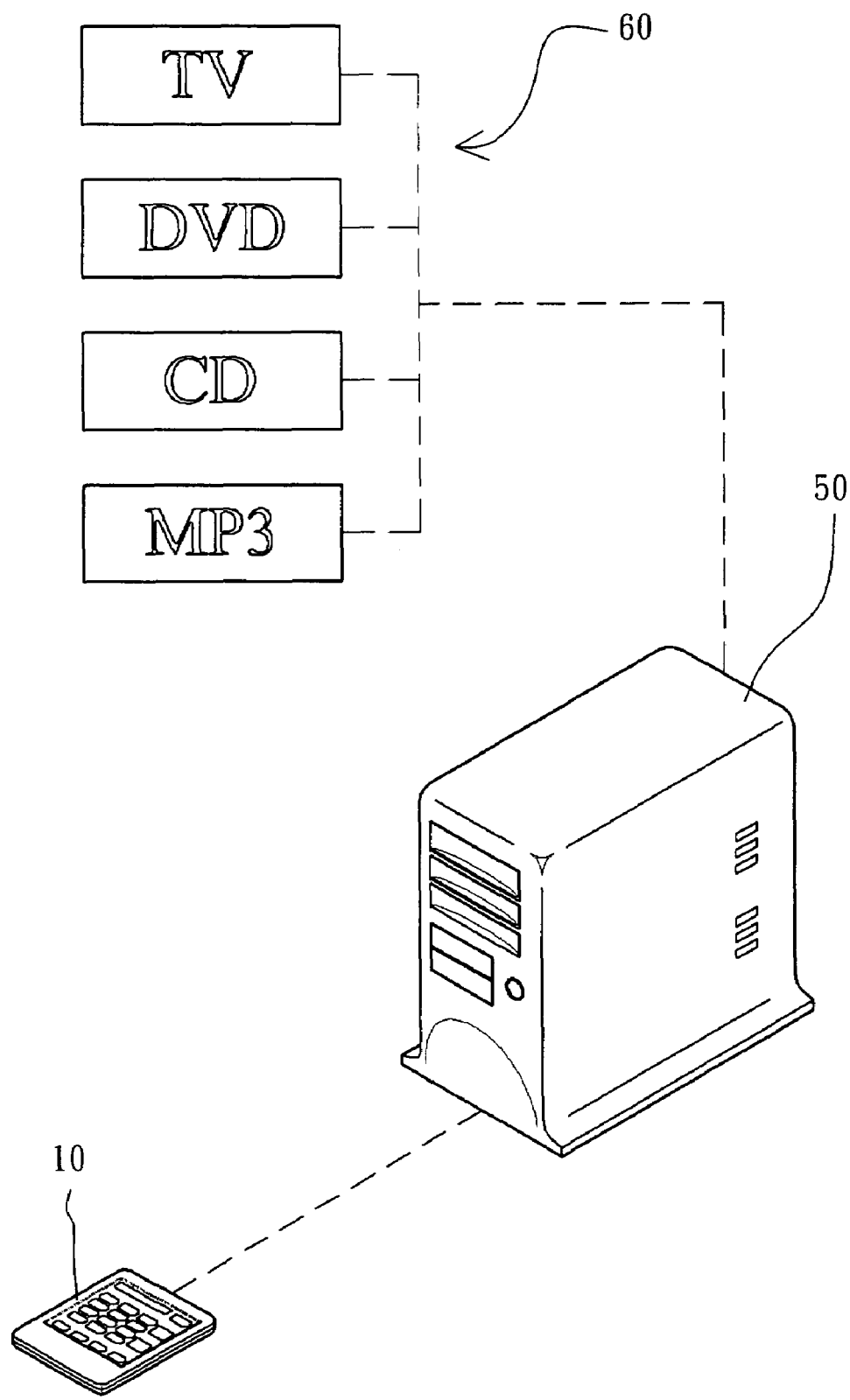
FIG. 3 is a schematic drawing showing communication between the remote controller and the host and the controlled device according to the present invention.

The communication unit 30 can be, for example, an infrared radio or bluetooth device for communication with a host 50 (see FIG. 3). The host 50 can be a PC (Personal Computer), home server, or media center. The host 50 has at least one control content, which is the control form of a controlled device 60 and its remote control program. The controlled device 60 can be a TV, DVD player, CD player, KaraOK system, MP3 multimedia player connectable to and controllable by the host 50. The control form and its remote control program can be downloaded from the attached CD provided by the manufacturer or the website of the manufacturer through the Internet.

The display unit 40 can be a touch panel or LCD display panel electrically coupled to the control unit 20 for displaying the downloaded control form. The display unit 40 has a display zone 41 and a control zone 42. The display zone 41 is adapted to display status or executing result. The control zone 42 comprises a plurality of buttons 421 through which the user operates the control form.

Figure 2:
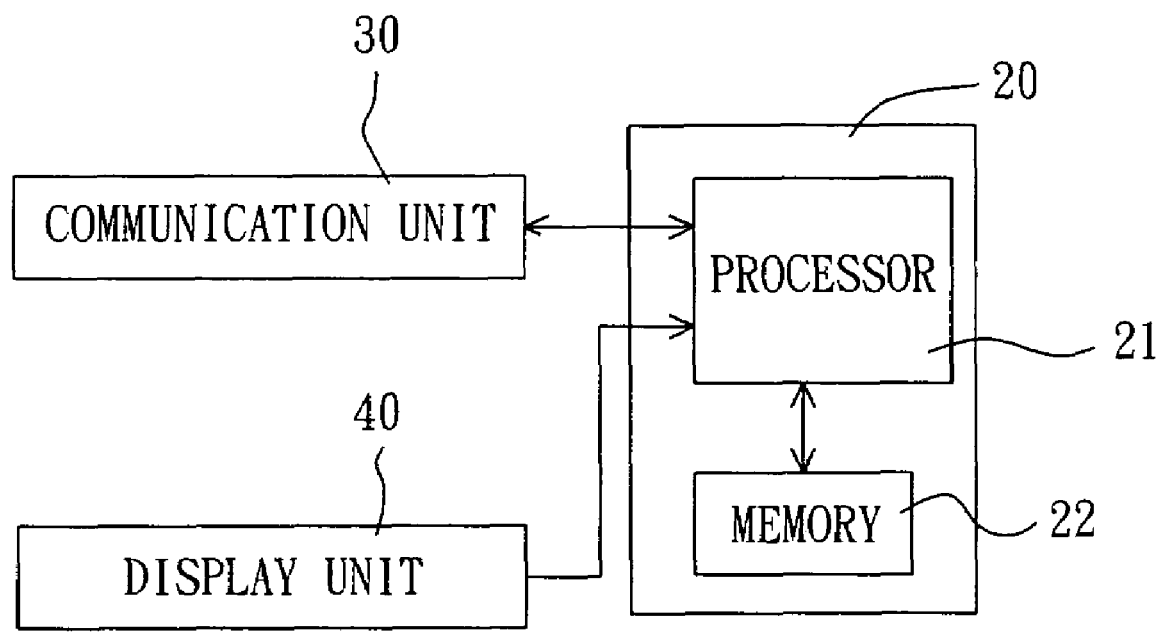
FIG. 2 is a system block diagram of the remote controller according to the present invention.

FIG. 2 is a system block diagram of the remote controller 1. As illustrated, the control unit 20 comprises a processor 21 and a memory 22. The processor 21 can be a microcontroller electrically coupled to the communication unit 30, the display unit 40 and the memory 21 for controlling the communication unit 30 to download the control content from the host 50, storing the downloaded control content, and display the downloaded control content on the display unit 40.

FIG. 3 is a schematic drawing showing communication between the remote controller and the host and the controlled device. As illustrated, the remote controller 1 can communicate with the host 50 through the communication unit 30 to download and store the control content and to display the control content on the display unit 40. Thus, the user can select the instruction by means of touch the buttons 421 in the control zone 42 of the display unit 40 to turn on/off power supply or to start playing or stop the play. The communication unit 30 sends the selected to the host 50 for processing, and then the host 50 sends the processed instruction to the controlled device 60, driving the controlled device 60 to execute the instruction. Therefore, the remote controller 1 can control the operation of the controlled device 60 without through the editing operation of an editing module.

Figure 4:
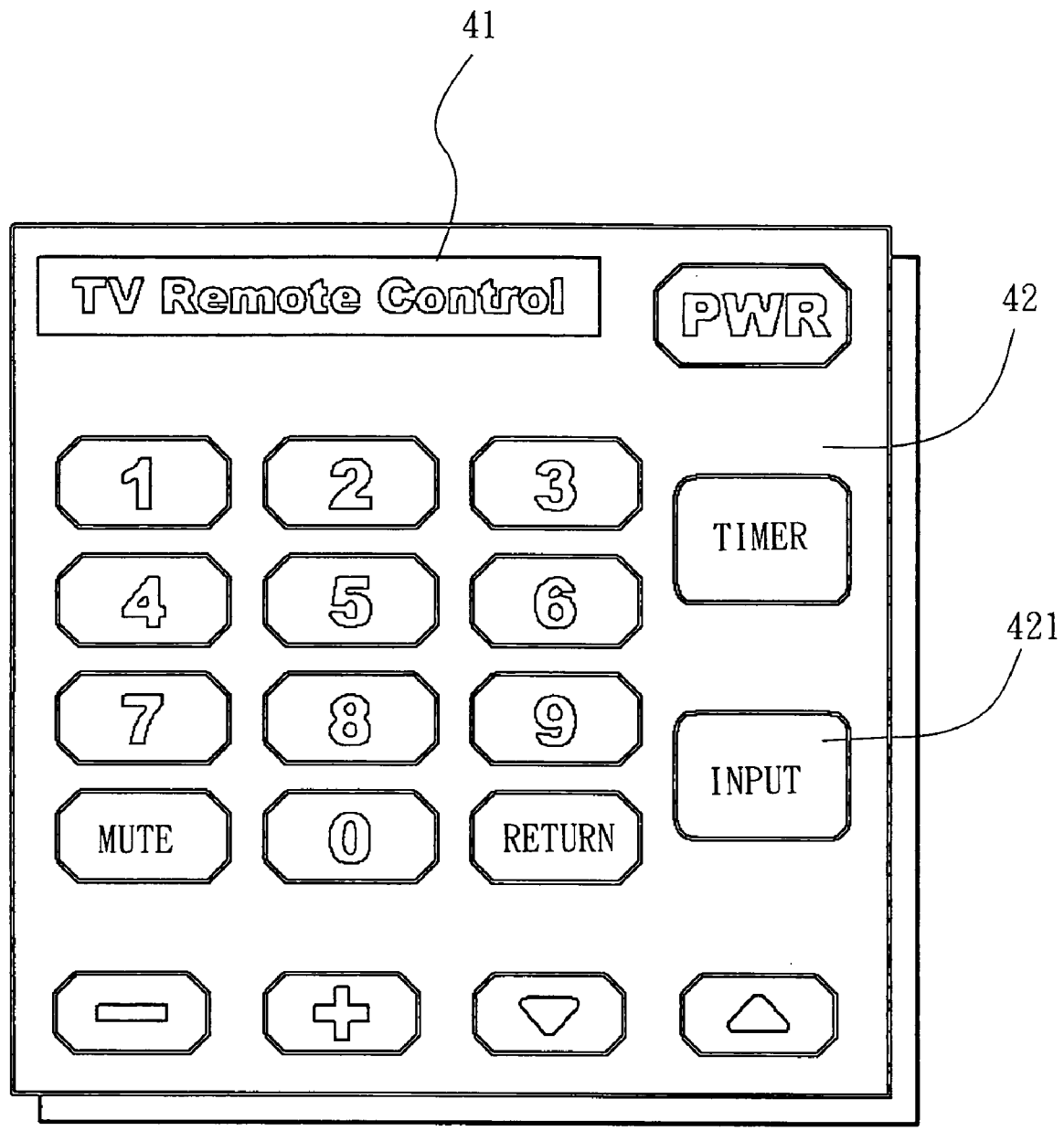
FIG. 4 is schematic drawing showing the control form of the control content of a TV displayed on the display zone of the display unit of the remote controller according to the present invention.

FIG. 4 illustrates the control form of the control content of a TV displayed on the display zone of the display unit of the remote controller according to the present invention. As illustrated, when wishing to use the remote controller 1 to control the operation of a TV, operate the communication unit 30 to communication with the host 50 and to download the TV control content, enabling the processor 21 to store the control form of the control content in the memory 22 and at the same time to display the control form of the control content on the display zone 41 of the display unit 40. At this time, the user can touch the button 421 in the control zone 42 of the display unit 40 to select from the control form the desired item, for example, channel selection, volume up or down, or mute, and then touch ENTER button to send the selected instruction to the host 50 through the communication unit 30, for enabling the host 50 to process the signal and to send the processed signal to the controlled device (TV) 60, driving the controlled device (TV) 60 to execute the instruction of channel selection, volume up or down, or mute.

Figure 5:
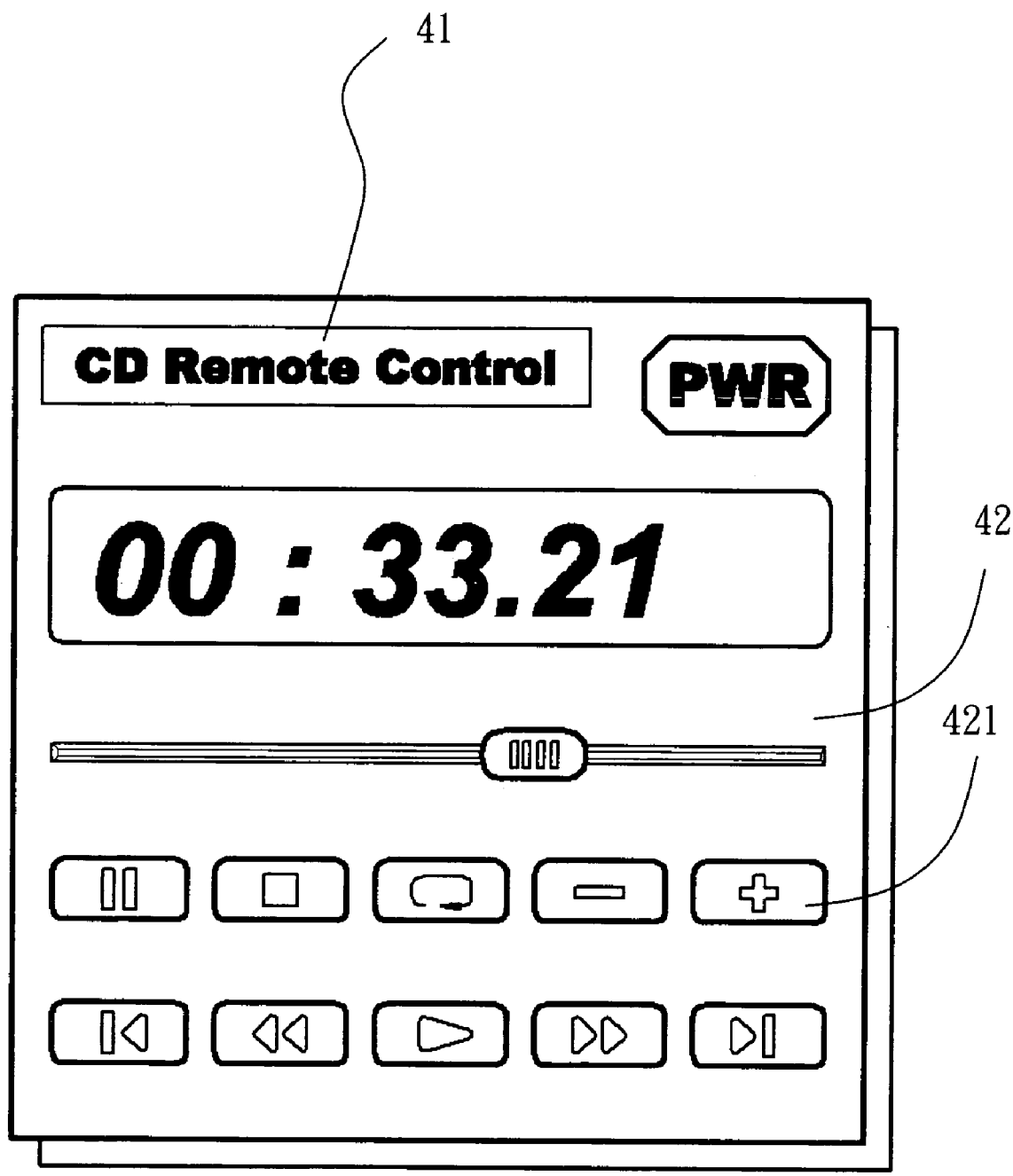
FIG. 5 is a schematic drawing showing the control form of the control content of a CD player displayed on the display zone of the display unit of the remote controller according to the present invention.

FIG. 5 illustrates the control form of the control content of a CD player displayed on the display zone of the display unit according to the present invention. As illustrated, when wishing to use the remote controller 1 to control the operation of the controlled device (CD player) 60, operate the communication unit 30 to communication with the host 50 and to download the control content of the controlled device (CD player) 60, enabling the processor 21 to store the control form of the downloaded control content in the memory 22 and at the same time to display the control form of the downloaded control content on the display zone 41 of the display unit 40. At this time, the user can touch the button 421 in the control zone 42 of the display unit 40 to select from the control form the desired item, for example, replay, last song, next song, pause, volume up, volume down, or the like, and then touch ENTER button to send the selected instruction to the host 50 through the communication unit 30, for enabling the host 50 to process the signal and to send the processed signal to the controlled device (CD player) 60, driving the controlled device (CD player) 60 to execute the instruction of replay, last song, next song, pause, volume up, volume down, or the like.

Figure 6:
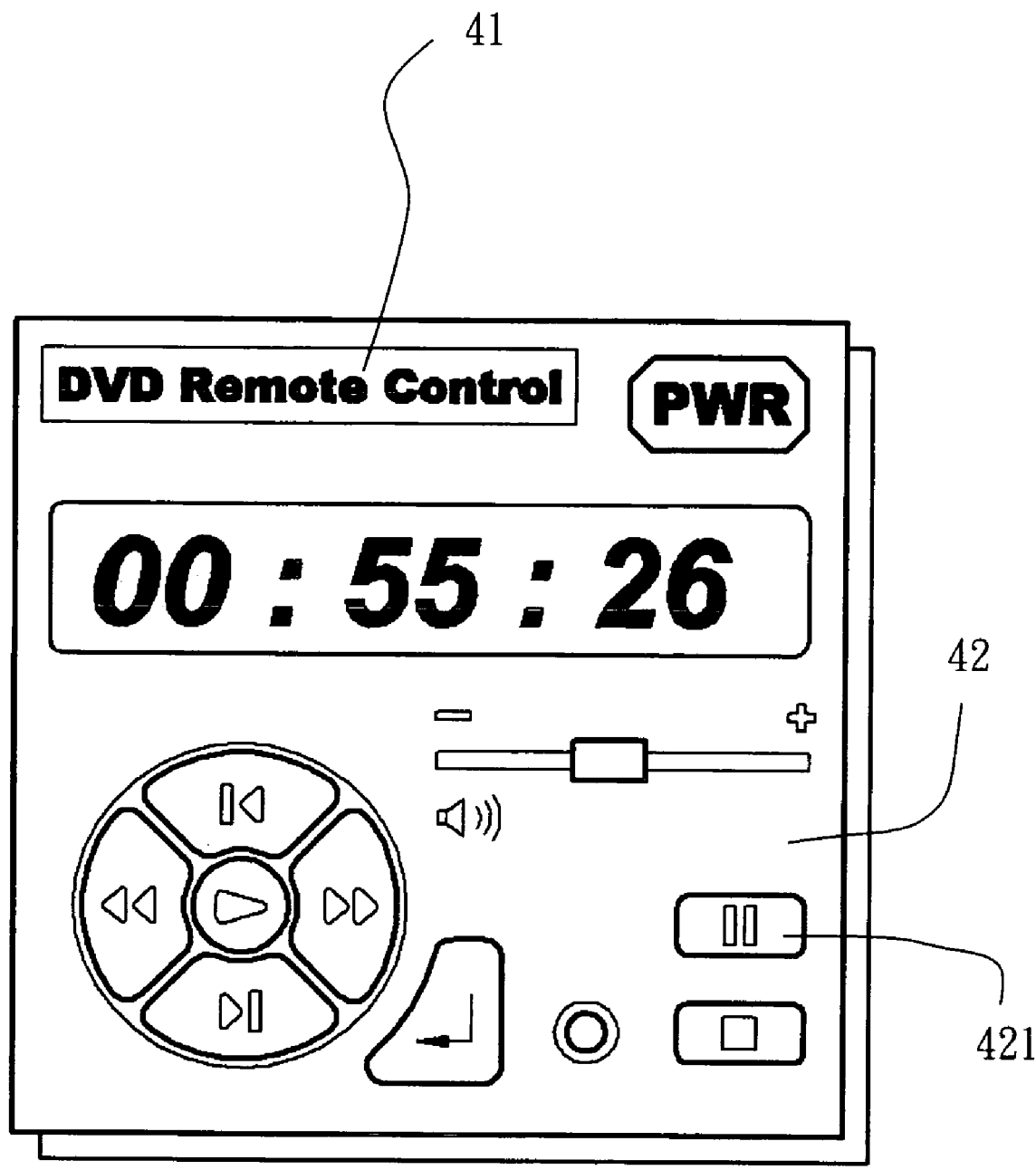
FIG. 6 is a schematic drawing showing the control form of the control content of a DVD player displayed on the display zone of the display unit of the remote controller according to the present invention.

FIG. 6 illustrates the control form of the control content of a DVD player displayed on the display zone of the control unit of the remote controller according to the present invention. As illustrated, when wishing to use the remote controller 1 to control the operation of the controlled device (DVD player) 60, operate the communication unit 30 to communication with the host 50 and to download the control content of the controlled device (DVD player) 60, enabling the processor 21 to store the control form of the downloaded control content in the memory 22 and at the same time to display the control form of the downloaded control content on the display zone 41 of the display unit 40. At this time, the user can touch the button 421 in the control zone 42 of the display unit 40 to select from the control form the desired item, for example, replay, last section, next section, pause, volume up, volume down, or the like, and then touch ENTER button to send the selected instruction to the host 50 through the communication unit 30, for enabling the host 50 to process the signal and to send the processed signal to the controlled device (DVD player) 60, driving the controlled device (DVD player) 60 to execute the instruction of replay, last paragraph, next paragraph, pause, volume up, volume down, or the like.

Figure 7:
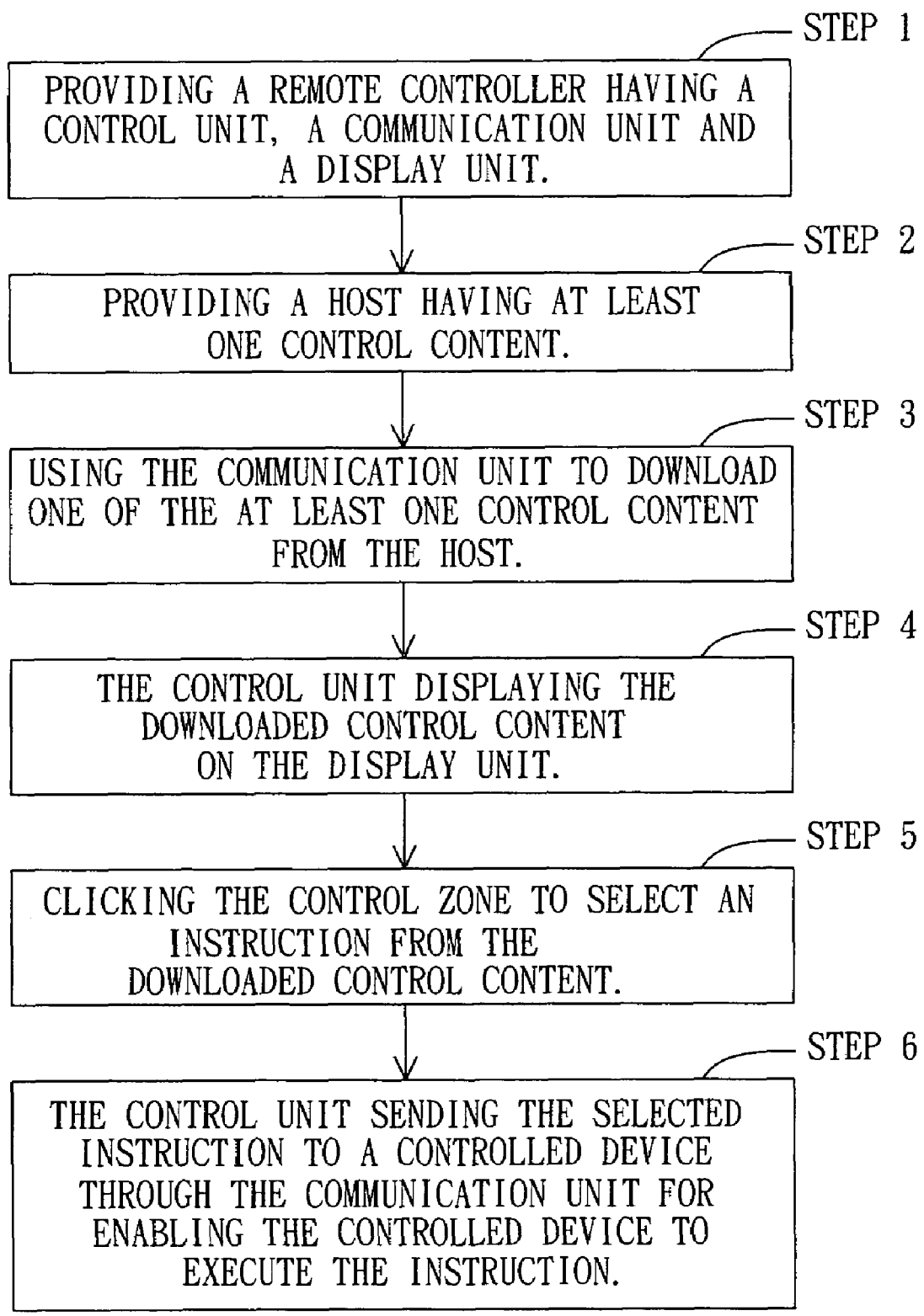
FIG. 7 is a flowchart showing the procedure of the control content downloading and executing method according to the present invention.

FIG. 7 is a flowchart showing the procedure of the control content downloading and executing method of the present invention. As illustrated, the control content downloading and executing method includes the steps of:

STEP 1: providing a remote controller 1, which comprises a control unit 20, a communication unit 30, and a display unit 40, which has a display zone 41 and a control zone 42;

STEP 2: providing a host 50, which has at least one control content;

STEP 3: using the communication unit 30 to download one of the at least one control content from the host 50;

STEP 4: the control unit 20 displaying the downloaded control content on the display zone 41 of the display unit 40;

STEP 5: clicking the control zone 42 to select an instruction from the downloaded control content; and STEP 6: the control unit 20 sending the selected instruction to a controlled device through the communication unit 30 for enabling the controlled device to execute the instruction.

In STEP 1, the remote controller 1 comprises a control unit 20, a communication unit 30 and a display unit 40, and the display unit 40 has a display zone 41 and a control zone 42. The characteristics and structure of the control unit 20, communication unit 30 and display unit 40 are same as what previously described.

In STEP 2, the host 50 has at least one control content, and the control content is the control form of the controlled device 60 and its remote control program. The controlled device 60 can be a TV, DVD player, CD player, KaraOK system, or multimedia player that is connected to and controllable by the host 50. The control form and its remote control program can be obtained from the attached CD provided by the manufacturer of the control device 60 or downloaded from the website of the manufacture of the controlled device 60 in the Internet.

In STEP 3 and STEP 4, the user uses the communication unit 30 to communicate with the host 50 and to download the control content (of which the control form and its remote control program are subject to the type of the controlled device 60), for enabling the control unit 20 to display the downloaded control form on the display zone 41 (please refer to the description related to FIGS. 4~7).

In STEP 5 and STEP 6, the user touches the buttons 421 in the control zone 42 of the display unit 40 to select the desired item from the control content so that the control unit 20 sends the respective instruction through the communication unit 30 to the controlled device 60 (for example, CD player), driving the controlled device 60 to execute the instruction.

As stated above, the remote controller of the present invention obtains control contents from an apparatus or host, and uses a communication unit such as an infrared radio, bluetooth device or the like to send control contents. The design of the present invention can download control contents from the host for controlling the operation of the controlled device. Because the invention eliminates the use of an editing module, the invention saves much the manufacturing cost of the remote controller and eliminates the drawbacks of conventional remote controllers.

A prototype of remote controller and its content downloading and executing method has been constructed with the features of FIGS. 1~7. The remote controller functions smoothly to provide all of the features disclosed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A remote controller comprising:
   a housing;
   a control unit mounted inside said housing;
   a communication unit mounted inside said housing and electrically coupled to said control unit and controllable by said control unit to communicate with an external host and to download a control content from said external host;
   said control content includes a control form and the related remote control program wherein said control form and said related remote control program are provided by a manufacturer of the controlled device, and are loaded from a disc provided by the manufacturer or downloaded from a website of the manufacture through the Internet;
   a display unit installed in said housing and electrically coupled to said control unit, said display unit comprising a display zone adapted to display the control content downloaded by said communication unit, and a control zone for inputting instructions for enabling inputted instructions to be sent to a controlled device through the external host by said communication unit to execute the instructions; and
   the external host processes the received instructions before the instructions are sent to the controlled device.

2. The remote controller as claimed in claim 1, wherein said control unit comprises a processor electrically coupled to said communication unit and said display unit and adapted to drive said communication unit to download a control content from an external host, and memory means electrically coupled to said processor and adapted to store the control content downloaded by said communication unit.

3. The remote controller as claimed in claim 1, wherein said display unit is a touch panel.

4. The remote controller as claimed in claim 3, wherein said control zone comprises a plurality of buttons for providing instructions corresponding to functions of replay, last paragraph, next paragraph, pause, volume up and volume down respectively.

5. The remote controller as claimed in claim 1, wherein said communication unit is an infrared radio or a Bluetooth device.

6. The remote controller as claimed in claim 1, wherein said display zone adapted to display the control content.

7. The remote controller as claimed in claim 1, wherein said host is one of the apparatus including personal computer, home server, and media center.

8. The remote controller as claimed in claim 1, wherein said controlled device is selected from the group consisting of a TV, a DVD player, a CD player, a KaraOK system, and a multimedia player being electrically connected to and controllable by said host.

9. A remote controller control content downloading and executing method comprising the steps of:
   (a): providing a remote controller, which comprises a control unit, a communication unit, and a display unit, which has a display zone and a control zone;
   (b): providing a host, which has at least one control content;
   (c): using said communication unit to download one of the at least one control content from said host wherein said control content includes a control form and the related remote control program and are provided by a manufacturer of the controlled device, and are loaded from a disc provided by the manufacturer or downloaded from a web site of the manufacture through the Internet;
   (d): enabling said control unit to display the downloaded control content on the display zone of said display unit;
   (e): clicking said control zone to select an instruction from the downloaded control content; and
   (f): enabling said control unit to send the selected instruction from said communication unit through the host to a controlled device and to drive the controlled device to execute the instruction, wherein the host processing the received instructions before the instructions are sent to the controlled device.

10. The remote controller control content downloading and executing method as claimed in claim 9, wherein said display unit is a touch panel.

11. The remote controller control content downloading and executing method as claimed in claim 10, wherein said control zone comprises a plurality of buttons for providing instructions corresponding to functions of replay, last paragraph, next paragraph, pause, volume up and volume down respectively.

12. The remote controller control content downloading and executing method as claimed in claim 9, wherein said communication unit is an infrared radio or a Bluetooth device.

13. The remote controller control content downloading and executing method as claimed in claim 9, wherein said display zone adapted to display the control content.

14. The remote controller control content downloading and executing method as claimed in claim 9, wherein said host is one of the apparatus including personal computer, home server, and media center.

15. The remote controller control content downloading and executing method as claimed in claim 9, wherein said controlled device is selected from the group of consisting of a TV, a DVD player, a CD player, a KaraOK system, and a multimedia player being electrically connected to and controllable by said host.

* * * * *